J. P. FRISBIE.
MACHINE FOR TRIMMING AND RIMMING PIES.
APPLICATION FILED JAN. 22, 1912.
1,039,505.
Patented Sept. 24, 1912.
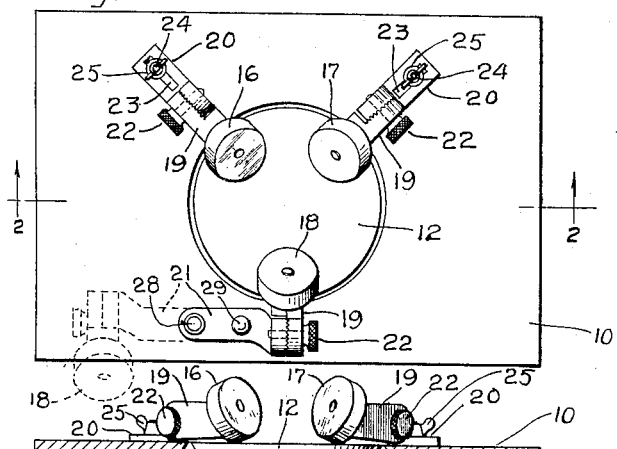
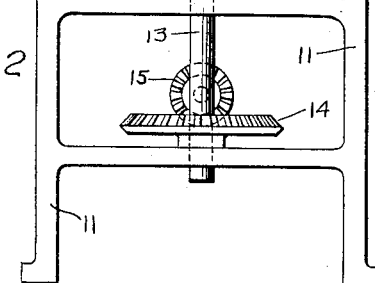
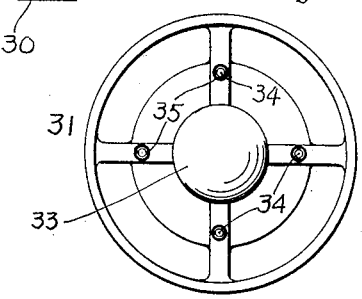
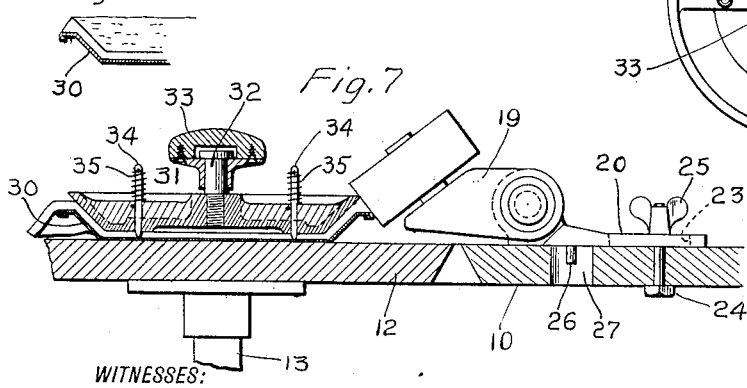
WITNESSES:
H. W. Meade
S. W. Atherton
INVENTOR
Joseph P. Frisbie
BY
A. M. Wooster
ATTORNEY

UNITED STATES PATENT OFFICE.

JOSEPH P. FRISBIE, OF BRIDGEPORT, CONNECTICUT.

MACHINE FOR TRIMMING AND RIMMING PIES.

1,039,505.  Specification of Letters Patent.  Patented Sept. 24, 1912.

Application filed January 22, 1912. Serial No. 672,710.

*To all whom it may concern:*

Be it known that I, JOSEPH P. FRISBIE, a citizen of the United States, residing at Bridgeport, county of Fairfield, State of Connecticut, have invented an Improvement in Machines for Trimming and Rimming Pies, of which the following is a specification.

This invention has for its object to provide an inexpensive, quick acting, easily operated and durable machine for trimming and rimming pies.

With these and other objects in view I have devised the simple and novel machine of which the following description in connection with the accompanying drawing is a specification, reference characters being used to indicate the several parts.

Figure 1 is a plan view of my novel machine as in use, the swinging roller being shown in full lines in its operative position as in trimming pies and in dotted lines in an inoperative position as in rimming pies; Fig. 2 a section on the line 2—2 in Fig. 1, looking in the direction of the arrows; Fig. 3 a detail sectional view showing the crusts of a pie before trimming; Fig. 4 a similar view after trimming; Fig. 5 a plan view of a form used in rimming pies; Fig. 6 a detail sectional view showing the crust of a one-crusted pie after the operation of rimming; and Fig. 7 is a sectional view on an enlarged scale, illustrating the operation of rimming a one-crusted pie.

The term "trimming" is used to indicate the operation of removing the surplus crust of two-crusted pies after the pies have been filled and the upper crust laid in place (compare Figs. 3 and 4). The operation of rimming is applied to one-crusted pies to define the operation of removing surplus crust from the edge and also banking up the crust at the rim of the pie so as to cause it to retain a semi-liquid filling, as the filling of pumpkin and custard pies, (see Fig. 6 and compare right and left sides of Fig. 7).

10 denotes a table resting upon framework 11 which may be of any ordinary or preferred construction. The table is provided with an opening which receives a rotating carrying plate 12, the surface of the carrying plate being shown as flush with the table. Rotation may be imparted to the carrying plate in any convenient manner. In the present instance I have shown this plate as carried by a vertical shaft 13 which also carries a gear wheel 14, the latter meshing with a pinion 15 on a horizontal shaft to which power is applied in any suitable manner.

The work of the machine is performed by means of trimming rollers indicated respectively by 16, 17 and 18 whose operative faces lie at an acute angle to the plane of the carrying plate and which coöperate with a pie plate on the carrying plate in both trimming and rimming and with a form, presently to be described, in the operation of rimming a pie. Rollers 16 and 17 are made adjustable radially to the carrying plate to adapt them to operate upon pies of different sizes and adjustable vertically to the carrying plate to adapt them to operate upon pies of different thickness. The rollers are carried by arms 19, the arms carrying rollers 16 and 17 being hinged to slidable plates 20 and the arm carrying roller 18 being hinged to a swinging plate 21. The hinge members on all of the arms and plates are provided with serrated engaging faces and the rollers are locked at any desired vertical adjustment by means of set screws 22 passing through the hinge members, thus providing an adjustment of the rollers to any ordinary thickness of pies. The adjustment of rollers 16 and 17 to adapt them to operate upon different sizes of pies is effected by moving the plates 20 by which they are carried inward and outward radially to the carrying plate. The plates are provided with slots 23 through which, and through the table, bolts 24 pass. Wing nuts 25 engaging the threaded ends of the bolts act to clamp the plates down upon the table and lock them in place. In order to prevent the possibility of the plates and rollers swinging laterally, any suitable means may be provided, as for example pins 26 in the plates which engage slots 27 in the table. Plate 21 by which roller 18 is carried is pivoted to the table as at 28 and is adapted to swing freely so as to move the roller into and out of operative position, a handle 29 being provided for convenience in operation.

In the operation of rimming, a form is used corresponding with the pie plates that are used but enough smaller in diameter to leave a space between the outer diameter of the form and the inner diameter of the pie plate to receive the required thickness of crust, as clearly shown in Fig. 7, in which 30 denotes a pie plate, ordinarily a sheet metal plate pressed to required shape, and 31 the form which may be made of sheet metal or may be cast as preferred. The form is provided with a fixed central stud 32 which carries a freely rotatable handle 33. In order to remove the weight of the form from the crust and thereby prevent the crust from sticking to the form, I provide pins 34 which extend through the bottom of the form and also pass through the lower crust and rest on the plate.

35 denotes coil springs, the upper ends of which are attached to the upper ends of the pins and the lower ends of which are attached to the form. These springs are contractile springs and their action is to draw the pins downward and to lift the form upward so that little if any weight will rest upon the crust.

The operation is as follows: For either trimming or rimming pies, plates 20 carrying rollers 16 and 17 are adjusted radially to adapt them to the size of the pies to be operated upon and are then locked in position by tightening up the wing nuts, and the rollers themselves are swung upward or downward as may be required to adapt them to the thickness of the pies to be operated upon and are locked in position after adjustment by tightening up set screws 22. When once adjusted to the size and thickness of pies to be operated upon, these rollers or the plates by which they are carried do not need any attention whatever until the size or thickness of the pies being operated upon is changed. Roller 18 is always adjusted in height, i. e. to the thickness of pies, to correspond with rollers 16 and 17 and does not require to be changed until the thickness of the pies operated upon is changed without regard to what their size, i. e. diameter, may be. In use, the carrying plate is continuously in rotation. In trimming pies, roller 18 is swung backward out of the way, the pie plate and crust to be operated upon are placed in position on the carrying plate in engagement with rollers 16 and 17, then roller 18 is swung against the pie plate and said plate is allowed to make one or more rotations on the carrying plate with all the rollers in engagement with the edge thereof. When the pie plate is placed on the carrying plate there will be a surplus of crust at the edge as in Fig. 3, which is removed by the operation of the trimming rollers in connection with the edge of the pie plate, as in Fig. 4. The carrying plate may be speeded relatively high and the operation of trimming a pie may be performed instantaneously.

The operation of rimming a pie differs in that roller 18 is not used but is swung around entirely out of the way, as indicated by dotted lines in Fig. 1. Having placed the single crust on the pie plate the form is placed centrally therein as in Fig. 7, then the pie plate is pushed upon the carrying plate by swinging the plate 21 in such manner that the roller 18 will engage the edge. The said edge is thus forced into contact with rollers 16 and 17 and is held in place by handle 33 upon the form. The handle remains stationary in the hand permitting the form and the pie plate to be rotated by the carrying plate. The form stands high enough above the plate so that when the rollers are set at the proper angle as in Fig. 7 (the edge of the roller being at an angle of forty-five degrees more or less to the carrying plate) the edges of the rollers will engage both the edge of the form and the edge of the pie plate, as clearly shown in Fig. 7. The result will be that in addition to trimming off the surplus crust as before the crust will be packed into the space between the rollers and the edges of the form and the pie plate and will form a raised rim of crust around the edge of the plate, as shown in Fig. 6 and at the right in Fig. 7.

Having thus described my invention I claim:

1. A machine of the character described comprising a rotary carrying plate, pivoted arms arranged around said plate, and trimming rollers supported by said arms.

2. A machine of the character described comprising a rotary carrying plate, pivoted arms arranged around said plate, and trimming rollers supported by said arms, the axes of said rollers being inclined with respect to the axis of said plate.

3. A machine of the character described comprising a rotary carrying plate, pivoted arms arranged around said plate, trimming rollers supported by said arms, and means for locking each arm at any point within the range of its pivotal movement.

4. A machine of the character described comprising a rotary carrying plate, pivoted arms arranged around said plate, trimming rollers supported by said arms, and means for locking each arm at any point within the range of its pivotal movement, the axes of said rollers being inclined with respect to the axis of said plate.

5. A machine of the character described comprising a table having an opening, a rotary carrying plate in said opening, plates secured to the table and radially adjustable relatively to the carrying plate, trimming rollers and arms by which said rollers are carried and which are pivotally connected to the plates.

6. A machine of the character described comprising a table having an opening, a rotary carrying plate in said opening, trimming rollers lying at an acute angle to the plane of the carrying plate, means for adjusting said rollers radially to the carrying plate and means for adjusting said rollers vertically to said plate.

7. The combination with a table having an opening and a rotary carrying plate in said opening, of trimming rollers lying at an acute angle to the plane of the carrying plate and a form adapted to be placed within a crust in a pie plate, the trimming rollers coacting with the edge of the form and the pie plate to trim off surplus crust and to rim the edge of the crust.

8. The combination with a rotary carrying plate, trimming rollers set at an acute angle to said plate and means for adjusting said rollers for the purpose set forth, of a form adapted to set within a crust in a pie plate and provided with a rotatable handle, the edge of said form and the edge of the pie plate co-acting with the trimming rollers to trim and to rim a crust upon the pie plate.

9. The combination with a rotary carrying plate, trimming rollers set at an acute angle to said plate and means for adjusting said rollers for the purpose set forth, of a form adapted to set within a crust in a pie plate and provided with a rotatable handle and spring controlled means whereby the weight of the form is supported, for the purpose set forth.

10. A machine of the character described comprising a rotary carrying plate, trimming rollers coöperating with said carrying plate to remove surplus crust from the edge of a pie plate thereon, and arms supporting said rollers one of said arms being adapted to swing in a plane parallel with the top of said plate.

11. A machine of the character described comprising a rotary carrying plate, trimming rollers coöperating with said carrying plate to remove surplus crust from the edge of a pie plate thereon, pivoted arms supporting said rollers, and a pivoted support for one of said arms adapted to swing in a plane parallel with the top of said plate.

In testimony whereof I affix my signature in presence of two witnesses.

JOSEPH P. FRISBIE.

Witnesses:
C. H. SHEEHAN,
S. W. ATHERTON.

---

Copies of this patent may be obtained for five cents each, by addressing the "Commissioner of Patents, Washington, D. C."